United States Patent [19]

Holland et al.

[11] Patent Number: 4,697,242
[45] Date of Patent: Sep. 29, 1987

[54] ADAPTIVE COMPUTING SYSTEM CAPABLE OF LEARNING AND DISCOVERY

[76] Inventors: John H. Holland, 3800 W. Huron River Dr., Ann Arbor, Mich. 48103; Arthur W. Burks, 3445 Vintage Valley Rd., Ann Arbor, Mich. 48105

[21] Appl. No.: 619,349

[22] Filed: Jun. 11, 1984

[51] Int. Cl.[4] .............................................. G06F 15/42
[52] U.S. Cl. ..................................... 364/513; 382/27; 382/42
[58] Field of Search .................. 364/513, 900; 382/34, 382/27, 42, 68

[56] References Cited

U.S. PATENT DOCUMENTS

| | | | |
|---|---|---|---|
| 3,950,733 | 4/1976 | Cooper et al. | 364/513 X |
| 4,254,476 | 3/1981 | Burrows | 364/513 X |
| 4,286,330 | 8/1981 | Isaacsor | 364/513 X |
| 4,384,273 | 5/1983 | Ackland et al. | 364/513 X |

FOREIGN PATENT DOCUMENTS

WO85/01601 4/1985 Pct Int'l Appl. ..................... 364/513

OTHER PUBLICATIONS

"Adaptive Pattern Recognition", Chow *IBM Technical Disclosure Bulletin*, Vol. 11, No. 11, April 1969.

*Primary Examiner*—Jerry Smith
*Assistant Examiner*—John R. Lastova
*Attorney, Agent, or Firm*—Allegretti, Newitt, Witcoff & McAndrews

[57] ABSTRACT

An electronic computing system capable of learning and discovery employing a language composed of conditional statements called "classifiers" which respond to and operate fixed-length binary words called "messages". Each classifier comprises a condition part which identifies the message(s) to which the classfier responds, and an action part which specifies the content of the generated message which may, in part, be a function of one or more of the input messages. An adaptive algorithm, called the "bucket brigade algorithm", tracks the history of each classifier's performance and develops a strength value which serves as a measure of the past usefulness of that classifier in reaching a defined objective. A genetic algorithm generates new classifiers which are based on the strongest of the existing classifiers and which replace the weakest of the existing classifiers.

40 Claims, 3 Drawing Figures

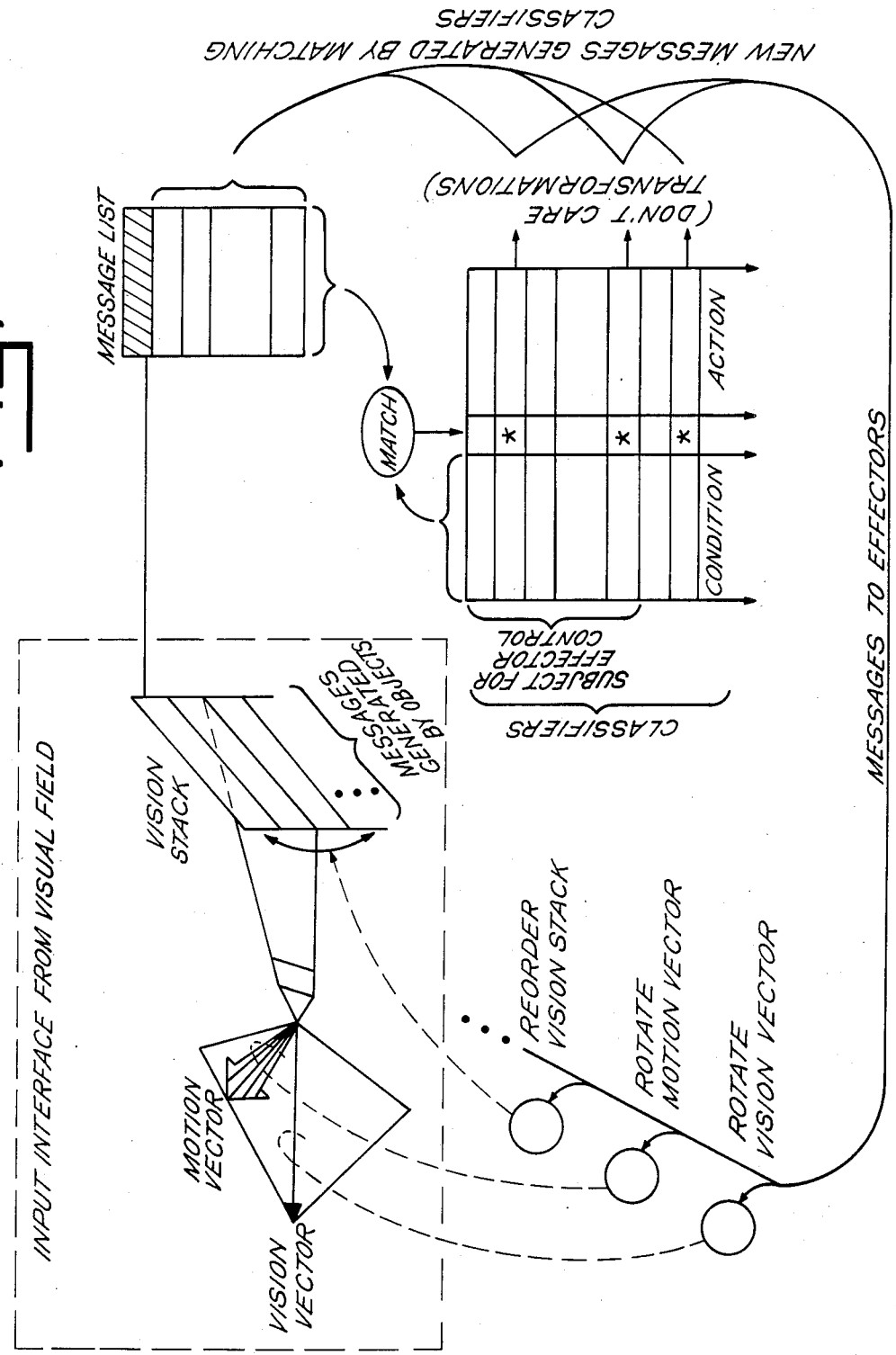

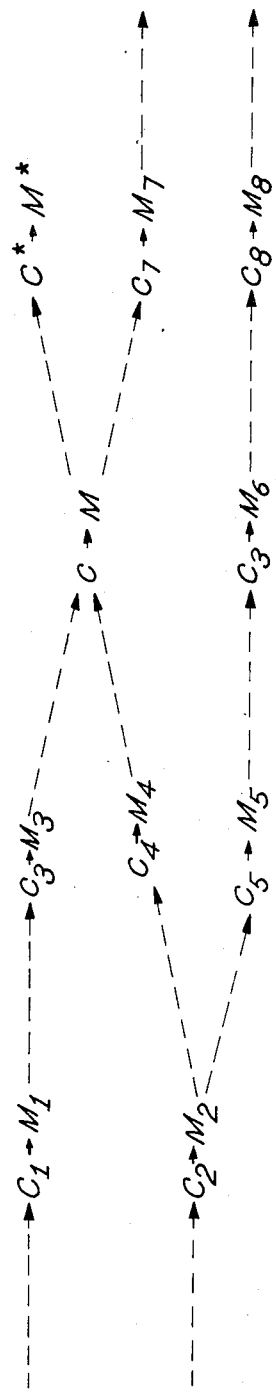

ADAPTIVE COMPUTING SYSTEM CAPABLE OF LEARNING AND DISCOVERY

SUMMARY OF THE INVENTION

This invention relates generally to data processing systems and, more particularly, to a system for rapidly processing data in parallel in accordance with adaptive algorithms.

Biological entities adapt to their environment by a process of progressive modification which improves their performance. The computing machine contemplated by the present invention is also capable of adapting to its environment (the stream of input data it receives) by progressively modifying a "procedural memory" which defines how further input data will be processed.

The relationship between naturally occuring biological processes and the adaptive mechanism employed in the computing machine to be described is more than a mere tutorial analogy. Much of the theoretical insight which forms the basis of the present invention was first developed through efforts to set up a mathematical framework which would facilitate the study of biological processes and adaptive algorithms which model those processes. This earlier work is reported in part in the following publications. *Adaptation In Artificial and Natural Systems,* by John H. Holland, the University of Michigan Press (1975); "Adaptation", by John H. Holland, *Progress in Theoretical Biology,* Academic Press (1976); "Cognitive Systems based on Adaptive Algorithms" by John H. Holland and Judith S. Reitman, *"Pattern-Directed Inference Systems",* Academic Press (1978); and "Adaptive Algorithms for Discovering and Using General Patterns in Growing Knowledge Bases" by John H. Holland, *International Journal of Policy Analysis and Information Systems,* Vol. 4, No. 3 (1980).

It is a principal object of the present invention to utilize principles of adaptation and evolution which contribute to the success of natural systems to provide a computing machine capable of learning and discovery.

The present invention takes the form of a computing system in which input data is acted upon by a set of concurrently running processes which compete with one another to better reach some result defined as being desirable. Like different biological species competing in an ecosystem, only those processes which are better suited for achieving the desired result survive and reproduce, replacing less successful processes. Also, as in biological evolution, means are employed to insure the survival of those processes exhibiting superior performance, and to form new processes which are composed of elements copied from pairs of successful but differing parent processes. Each new process thus created enjoys a reasonable prospect of outperforming either of its parents.

In accordance with a feature of the invention, each of the concurrently running processes which operate on the input data stream is carried out by the sequential execution of one or more conditional instructions called "classifiers". If the condition(s) of a given classifier are satisfied, that classifier generates a "message" which is placed in a message store. Input data also take the form of messages which are placed in the store. A "condition" of a classifier is nothing other than a definition of the attributes of a particular class of messages. Thus, the condition part of a classifier is used to identify which (if any) of the current set of available messages in the store will participate with that classifer in the production of the next generation of messages. The locus of control for a successful process may accordingly be traced from the introduction of input message data along the chain of classifier-to-message-to-classifier links, ultimately leading to the generation of a message which is utilized as output data.

In accordance with the invention, a message preferably takes the form of a fixed length binary string (or word) which may be subdivided into fields of contiguous bits, each field having a particular meaning. A classifier is composed of an action part and one or more condition parts. Both the action and condition parts of a classifier comprise fixed-length strings (words) made up of ternary vales and having the same length as the number of bits in a message.

The store collection of classifiers and messages forms, at any given moment, the procedural memory which specifies how further input data will be handled. During each machine cycle, every stored classifier is compared against every stored message to generate a new set of internally-generated messages (which are combined with the newly-received, externally-generated input messages). Thus messages are rewritten on every machine cycle. The collection of classifiers is also altered (but much more gradually) in accordace with an adaptive alogrithm with the aim of enhancing the performance of the system.

In accordance with a feature of the invention, the computing machine includes means for storing a strength value associated with each classifier and further incudes means for storing an index value which is associated with each message and which identifies the classifier that produced that message. Whenever a classifier generates a message which is carried over into the next major cycle, it rewards the classifier(s) which supplied the input message, increasing the strength of the supplying classifiers (which share the reward equally) and decreasing the strength of the supplied classifier (which will be itself rewarded if its message is used in a subsequent cycle). In this way, the strength of each classifier which produces useful messages is enhanced over time while the strength of those which are unable to produce useful messages deteriorates.

According to another feature of the invention, the number of messages passed to a subsequent cycle is limited to a number less than the total number of messages which would be generated by classifiers whose condition(s) are satisfied. Accordingly, means are employed for discarding messages generated by weaker and more general classifiers in favor of messages produced by classifiers having greater associated strength values and which are more specific (that is, which respond to a more limited number of messages).

As contemplated by the invention, the strength value associated with a given classifier is used, not only to improve the chances that that classifiers messages will be accepted into successive cycles, but also as a measure of "fitness" which enhances the classifiers prospects of survival and its attractiveness as a mating partner for reproduction. Pairs of classifiers having high relative strength values are employed to form new combination classifiers using random genetic operators, the most important of which, called "crossover", involves the selection of a string position at random, splitting both parent classifiers at that position, and exchanging parts to form two new child clasifiers which replace the weakest (lowest strength) classifiers. Other genetic operators, called "mutation" and "inversion" operators, may also be employed on a more limited basis to avoid overemphasizing particular kinds of classifiers.

The principles of the present invention permit the construction of a very rapid processor because the underlying algorithm may be executed to a large extent with a parallel hardware architecture. This follows from the fact that, in each major cycle, all classifiers are to be matched against all messages. These matching operations may be carried out in parallel by placing all messages (for example) in an associative memory device, so that the conditions of each classifier may be compared against all messages simultaneously. Alternatively, messages may be processed against all classifiers simultaneously, or even greater speed may be achieved by fully parallel matching of all classifiers and all messages simultaneously. The hardware parallelism which the invention makes possible, coupled with the "inherent parallelism" of the adaptive algorithm itself (a topic to be discussed later), makes it possible to construct computing machines capable of searching out useful solutions in vast, combinatorially-complex spaces under circumstances where conventional methods would fail because of the practical impossibility of executing decision procedures that cover all contingencies.

These and other objects, features and advantages of the present invention will be more fully explained in the course of the following detailed description of a preferred embodiment of the invention. In the course of this description, reference will frequently be made to the attached drawings, in which:

DESCRIPTION OF THE DRAWINGS

FIG. 2 illustrates the application of the basic classifier system to the control of a two-dimensional sensing-acting system; and FIG. 3 is a diagram representing the merging and branching history of chains of classifier-message interactions.

DETAILED DESCRIPTION

Figure 1:
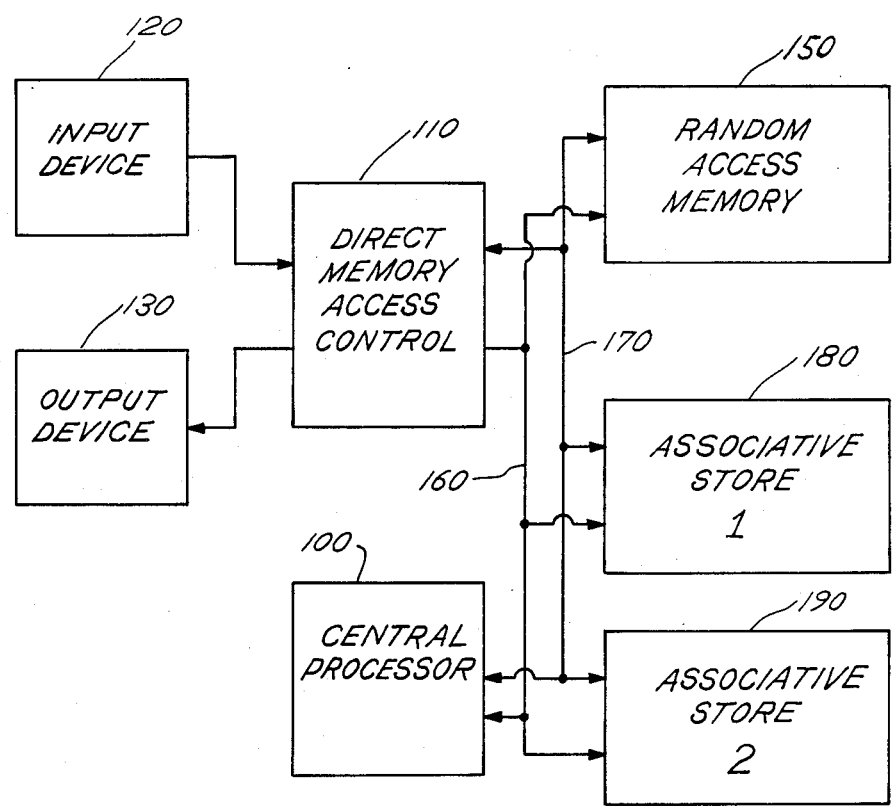
FIG. 1 is a block diagram of a conventional data processing system modified to incorporate associative memory arrays for the high-speed matching of classifier conditions and messages.

The present invention uses a system of notation or "language" called a "classifier system".

There are two basic kinds of elements in a classifer system: messages and classifiers. As a first approximation, messages and classifiers correspond to conventional computer data and computer instructions, respectively. Input information is expressed in messages, messages hold the intermediate steps of a computation, and messages convey information to the output. Classifier are like ordinary computer instructions insofar as they operate on messages to produce new messages. In the simplest case, a classifier is a rule with an antecedent condition and consequent "action." If a message satisfies the antecedent, the consequent generates a new message from the satisfying message. This new message may lead directly to action, but usually it is stored as an intermediate result of the computation.

Despite the similarity just described, the usual distinction between data and instructions does not apply to messages and classifiers. Instructions are normally linked to each other and to data by means of addresses. In contrast, the classifier system does not use addresses in any direct sense. Messages are not located by addresses, and classifiers do not contain addresses.

A message is simply a binary word composed of characters from the alphabet (0,1). A classifier is a rule or conditional statement whose constituents are words drawn from a ternary alphabet (0,1,#); a classifier has one or more words or conditions as antecedents, and an action statement as consequent. If a message (or messages) satisfies (satisfy) the condition(s) of a classifier, the action statement specifies the content of the output message. The symbol "#" plays two roles: in a condition of a classifier "#" signifies "don't care," while in the action statement "#" marks a place where a bit in the new message comes from the (first) satisfying message. "Classifiers" are so-called because they can be used to classify messages into general sets, but, as will be seen, classifiers are much broader than this in concept and application.

The most elementary computational operation of the classifier system is the comparison of a classifier with a message. Consider, for example, a classifier of the form "If $C_1$ and $C_2$ then A" and two messages $M_1$ and $M_2$ where all the words $C_1$, $C_2$, $M_1$, $M_2$ and A have the same number of characters. A message satisfies a condition if each bit 0 and 1 of the condition agrees with the corresponding bit of the message; bits of a message corresponding to the don't cares (#'s) of a condition are ignored in the comparison. Consider a case in which the messages $M_1$ and $M_2$ satisfy the conditions $C_1$ and $C_2$ respectively. Then the messages $M_1$ and $M_2$ and classifier "If $C_1$ and $C_2$ then A" produce a new message M* by the rule: for each position of A with a bit 1 or 0, that bit goes into M*; for each position of A with a don't care (#), the corresponding bit of $M_1$ goes into the new message M*. For example, the message pair 10100,11011 satisfies the classifer If ##1 0 0 and 1 1 #1 1 then #0 #0 0,
and hence the new message 10100 is produced.

By selecting some bit positions as tag positions the system user can define classes of messages to which a classifier responds or which a classifier can produce. Assume, for example, that classifiers $X_1$ and $X_2$ produce messages with tags 101 and 111 respectively. All classifiers with conditions that have 1#1 in tag parts will potentially respond to messages produced by both $X_1$ and $X_2$. By this technique one message can be linked to another via a classifier, one classifier can be linked to another via a message, and these links can be iterated indefinitely. Such tags may be used for addressing and to establish networks of various kinds.

Note that the quantity of a condition or action may be measured by the fraction of its characters that are #'s. Thus the condition 1## is satisfied by four messages (100,101,110,111) and hence is more general than the condition 1#1, which is satisfied by only two messages (101,111). The ease with which generality is measured is an advantage when learning algorithms are added to basic classifier systems.

A classifier as contemplated by the present invention may have an arbitrary number of conditions and may be described by the following notation: Condition i of a b-condition classifier X is specified by the string $C_i$ of length k over the symbols (1,0,#) and is prefixed by a "-" if the condition i is negated; the action part is specified by a single string A of length k over the symbols (0,1,#); the conditions of the condition part are separated by ","; and the action part is separated from the condition part by "/". thus, the specification for the classifier X has the form $C_1, C_2, \ldots C_b/A$.

The condition part of X is satisfied if each condition $C_i$ is satisfied by some message on the current message list. When the condition part is satisfied, an outgoing message $M^*$ is generated from the message $M_1$ which satisfied condition $C_1$ as before: at each character position of A which is a 0 or 1, $M^*$ gets that bit; at each character position of A which is a #, $M^*$ gets the corresponding bit from $M_1$.

Although a classifier system restricted to this single type of classifier (here called the "simple comparision classifier") can be shown to be computationally complete (that is, capable of expressing any finite automaton), the classifier system can be augmented by adding arithmetic and logic functions of the conventional type. These added classifiers have the same form as that of simple comparison classifier with the addition of an operation identifier or "op-code" I, as seen from the notation:

$C_1, C_2, \ldots C_b/IA$ where I is a binary code value identifying a specific operation to be performed on value fields of the messages satisfying conditions $C_1$ and $C_2$ (used as operands), the result of the operation being placed in the value field of the output message. The remaining bits of the output message are formed in the conventional way from the message satisfying $C_1$ and the specification contained in A.

The length of the value field is selected based upon the particular application's need for accuracy. For example, the field might comprise 32 bits (four bytes) for the expression of numerical data in conventional single-precision floating point format for applications requiring moderate accuracy.

The various operations which may be performed correspond directly with the arithmetic and logical operators used in conventional computer languages. With "A" and "B" representing the numerical value in the value field of the messages satisfying $C_1$ and $C_2$ respectively, the arithmetic and logic operators may be written as follows:

| EXPONENTIATON | A**B |
| MULTIPLICATION | A*B |
| DIVISION | A/B |
| ADDITION | A + B |
| SUBTRACTION | A − B |
| CONJUNCTION | A AND B |
| DISJUNCTION | A OR B |
| EXCLUSIVE OR | A XOR B |
| IMPLICATION | A IMP B |
| EQUIVALENCE | A EQV B |

In addition to the arithmetic and logic operators noted above, the classifier system may include intrinsic mathematical functions which place a value in the value field of the output message which is functionally related to the value A in the value field of the message satisfying $C_1$. These functions once again corresponding directly to the intrinsic functions made available to the programmer in many conventional languages.

| ABSOLUTE VALUE | ABS(A) |
| ARCTANGENT | ATN(A) |
| COSINE | COS(A) |
| RAISE e TO THE POWER A | EXP(A) |
| NATURAL LOGORITHM | LOG(A) |
| RANDOM NUMBER | RND(A) |
| RETURN SIGN OF A | SGN(A) |
| SINE | SIN(A) |
| SQUARE ROOT | SQR(A) |
| TANGENT | TAN(A) |

Other mathematical functions not included among the intrinsic functions noted above can be readily realized by using tag fields to chain a sequence of the logical operators and intrinsic functions to form the desired result.

A computation or run on the computing machine contemplated by the invention begins with a stored set of classifiers and messages. The initial set of classifiers may be entirely composed of random numbers, but preferably includes a set of programmer written classifiers which represent "educated guesses" at likely solutions. The initial message set comprises the initial messages from the input device(s). The computation consists of a sequence of execution steps or major cycles. During a major cycle the machine compares all classifiers to all messages and produces a new message list by the following rules:

(1) Add all messages from the input interface to the old message list to receive system input.
(2) Compare all messages to all classifiers and, for each classifier whose conditions are satisfied, generate a new message and place it on the new message list
(3) Replace the old message list by the new message list.
(4) Process the new message list through the output interface to produce system output.
(5) Return to (1).

The adaptive algorithm of the present invention may be executed on a conventional general purpose computer programmed in a conventional language. In this case, messages, classifiers, strength values, indices, etc. would be stored in random access memory in the conventional way. The use of a computer having a conventional architecture fails, however, to capitalize on the possibility of parallel processing which the algorithm makes possible. In the conventional processor, during each major cycle, the first classifier would be matched against each stored message in sequence, the matching process would then be repeated for the second classifier, and so on. This one-at-a-time matching process is not necessary, however, since none of the comparisons within a cycle requires the results of any other comparison before it can start. Given the needed hardware, all of the comparisons could be made simultaneously and, when matches are found, the tasks which form the output messages specified by the matched classifiers could also proceed in parallel. The conventional sequential processor is unfortunately unable to capitalize on the possibility of parallel processing afforded by the present invention.

However, a conventional general purpose computer may be readily modified to allow it to much more rapidly execute the algorithm contemplated by the invention. FIG. 1 of the drawings is a block diagram of such a modified machine, which comprises a central processing unit 100, a direct memory access controller 110, and input and output devices 120 and 130 respectively. The CPU 100 and DMA controller 110 are connected to a random access memory (RAM) 150 by an address bus 160 and a data bus 170. This completely conventional arrangement is modified by the addition of a pair of associative memory arrays 180 and 190 which share the available address space with RAM 150. The associative stores 180 and 190 are used in alternation, allowing each classifier (stored in RAM 150) to be compared with all messages in the current message list (stored in one of the associative stores 180 or 190), and, for each matching message found, a new message is written to the other of the two associative arrays.

Other than the comparison operation in which a classifier condition is matched against all messages simultaneously, the remaining operations required are all accomplished in the conventional way. Input data from input devices 120 are initially written into RAM 150 by the controller 110. The processor 100 converts this input data into message format and writes the messages into one of the stores 180 or 190. For those classifiers whose conditions are satisfied, the processor 100 handles the formation of a new message in accordance with the op-code I and action specification A of the classifier; and performs the remaining steps of the adaptive algorithm (to be described), all using conventional sequential programming techniques. Thus, the arrangement shown in FIG. 1, although capable of much faster execution because of the use of the associative memory arrays for the comparison operations, does not take full advantage of the opportunity to use a more completely parallel architecture. Still further speed enhancements could be obtained by independently and concurrently processing each satisfied classifier to form the message specified by the action part of that classifier and placing that message on the new message list, and calculating the bid value associated with that newly generated message.

The schematic diagram of FIG. 2 shows how a basic classifier system can constitute a control routine for a cognitive system operating in a two-dimensional environment. The environment contains objects distributed over the planar surface. The input interface produces a message for an object in the field of vision. This message indicates the relative position of the object in the field of vision (left-of-center, center, right-of-center) and whether it is distant or adjacent to the sytem. The classifiers process this information in order to issue commands to the output interface (ROTATE VISION VECTOR [LEFT, RIGHT] COUPLE MOTOR VECTOR TO VISION VECTOR, MOVE FORWARD, STOP). The control routine proceeds by stages, first centering the object, then aligning the direction of motion to the vision direction, next moving forward in that direction, and finally stopping when adjacent to the object. Thus if there is an object of a specified type anywhere in the system's field of vision this classifier routine acts to bring the system next to the object and to hold it there.

The robot classifier of FIG. 2 has the skill just described, that of locating an object in an environment. Traditionally, psychologists have viewed skills as responses to stimuli; and these could be computerized as sets of stimulus-response rules. The notion of skill corresponds in a classifier system to a set of classifier operations occurring in a single major cycle: input message and internal messages are operated on by a set of classifiers to produce output messages. However, a classifier skill is a much more complex and powerful entity than a simple stimulus-response connection. For in a classifier system an input message does not usually lead directly to an output message through a classifier, but typically is the first item of a long chain of alternating messages and classifiers, the last item of which is an output message. FIG. 3 shows a representative slice of classifier-message production history. Moreover, as FIG. 3 illustrates, an alternating message-classifier chain is generally part of a non-cyclic graph with merging and branching. Hence a typical classifier skill is based on a set of complex series-parallel computational histories.

A classifier operating in a computer functions as a deductive rule of inference, drawing conclusions (new messages) from premises (old messages). To achieve learning we extend the basic classifier system to a goal-directed system in which successful actions are rewarded, and we add an algorithm that learns from experience how much each classifier contributes to the goals of the system. This algorithm is called the "bucket brigade algorithm". A strength parameter is associated with each classifier to measure its strength or utility to the learning system. The bucket brigade algorithm modifies the strength parameter of each classifier according to the contribution of that classifier to successful output message. The algorithm also uses the most effective classifiers to control the output reactions of the classifier system to input stimuli.

A basic classifier system together with a bucket brigade algorithm can learn which skills are most useful in a given environment, and can even track a changing environment. But it can only work with the classifiers it is given, and has no ability to generate new classifiers. Another algorithm, called the "genetic algorithm," does this. It combines old classifiers to make new classifiers, biasing the production in favor of those classifiers which have the largest strength parameters, and using probabilities to widen the set of possibilities. This is the classifier machine way of creating new and promising hypotheses.

Thus a classifier system capable of skill, learning, and discovery is organized hierarchically into three levels:
Discovery level; genetic algorithm
Learning level: bucket brigade algorithm
Skill level: basic classifier system.

Before consdidering the bucket brigade and genetic algorithms in more detail, however, a better understanding of the basic classifier system may be obtained through a consideration of the simple classifier control system shown in FIG. 2.

The messages, the condition parts of classifiers, and the action parts of classifiers will be considered in turn. In the example to follow, each of these is 16 bits long.

The leftmost bit of a message is a tag: it is 1 for an interface message and 0 for any other kind of message. The next twelve bits specify the properties of an object. There are twelve independent properties, with 1 indicating the presence of and 0 indicating the absence of a property in an object. For concreteness we will stipulate that the system is searching for objects that satisfy the condition #111000#########, that is, for objects which have the firt three properties and lack the next three, whether or not they have the remaining six properties.

The last three bits in an interface message give information about the relative position of the object in the field of vision. They are interpreted as follows:
bits 14, 15:
  1,0 object left-of-center
  0,1 object right-of-center
  0,0 object centered
bit 16:

1 object adjacent
0 object not adjacent.

Thus, the message 11110001 01011100 indicates the presence in the visual field of an object of the specified type that is left-of-center and not adjacent, only the underlined bits being relevant to this interpretation.

Classifier conditions will be abbreviated as follows:
x=desired object x is present in the field of vision
c=object is centered
l=object is left-of-center
r=object is right-of-center
a=object is adjacent
−a=object is not adjacent.

Following these conventions, [x,1,−a] specifies the condition 1111000######100, and so on.

The action part of each classifier specifies a 16 bit message issued when the conditions of the classifier are satisfied. Each such message will simply be abbreviated as the corresponding 16 bit integer. That is, "[4]" abbreviates the message 00000000 00000100 the tag 0 at the first position indicating this is not an interface message.

This classifier routine controls three effectors: an effector to move the direction of vision incrementally (15 degrees in the simulation) to the left or right, a second effector to set the direction of motion parallel to the direction of vision, and a third effector to cause the system to move forward one unit in the direction of motion. If not command is issued to a given effector at a given major cycle or time-step that effector retains its last setting. In presenting the action effected by messages to effectors we will use L=rotate vision vector 15 degrees to the left
R=rotate vision vector 15 degrees to the right
P=set the move vector parallel to the vision vector
G=move one unit forward in the move vector direction.

There are nine classifiers in this illustrative system. The first four lead to operations by the remaining five, the next three cause output actions, the eighth causes the system to halt, and the role of the last classifier will be explained in a moment.

C1 [x,1]/[4]
C2 [x,r]/[5]
C3 [x,c,−a]/[6]
C4 [x,c,a]/[7]
C5 [4]/[8] [8] causes effector action L
C6 [5]/[9] [9] causes effector action R
C7 [6]/[10] [10] causes effector actions P and G
C8 [7]/[11] [11] causes the cycling to halt.
C9 [4or5or6or7]/[0]
(Note that the condition [4or5or6or7] is specified by the string 00000000000001##.)

If an object of the desired type x appears at the far left of the field of vision at major cycle t, classifier C1 would be activated, placing message [4] on the message list at major cycle t+1. Assuming the object x is still left-of-center, the clasifiers C1, C5, and C9 become active at major cycle t+1 and the message list consists of 4 messages: [4], [8], [0], and the message from the input interface. This list of messages continues until x is centered as a result of the repetitions of the L command, whereupon C3 would be activated, and so on.

Note that the message [4] provides a recoding of the message from the input interface, "linking" this information to the classifier C5 ([4]/[8]) which causes effector action L. Any message [m] could have been used for this purpose; for example, the pair of classifiers [x,1]/[m] and [m]/[8] would have produced the same action L. It is this "internal" recoding that permits the classifier systems to carry out arbitrary computations, so that formally speaking, classifier languages are computationally complete.

The execution sequence of this classifier system proceeds as follows:

| Major cycle (time) | Active Classifiers | Message List | |
|---|---|---|---|
| t | C1 | 11110001 | 10000100 |
| | | [4] | |
| t+1 | C1, C5, C9 | 11110001 | 10000100 |
| | | [4] | |
| | | [8] | |
| | | [0] | |
| t+2 | C1, C5, C9 | 11110001 | 10000100 |
| | | [4] | |
| | | [8] | |
| | | [0] | |
| (t+c is the time at which object × is first centered) | | | |
| t+c | C3, C9 | 11110001 | 10000000 |
| | | [6] | |
| | | [0] | |
| t+c+1 | C3, C7, C9 | 11110001 | 10000000 |
| | | [6] | |
| | | [10] | |
| | | [0] | |
| (t+a is the time at which the system is first adjacent to object x) | | | |
| t+a | C4, C9 | 11110001 | 10000001 |
| | | [7] | |
| | | [0] | |
| t+a+1 | C4, C8, C9 | 11110001 | 10000001 |
| | | [7] | |
| | | [11] | |
| | | [0] | |
| (The system has now halted adjacent to object x.) | | | |

It is clear that the classifier [4or5or6or7]/[0] played no role in this example. It is inserted to illustrate the concept of a support classifier, which is useful when the bucket-brigade algorithm (sec.2.3) is incorporated into this classifier system. In that case the classifier [4or5or6or7]/[0] serves to reinforce the whole set of classifiers. With further additions such a classifier can be used to call the whole routine when an object x appears.

The "bucket brigade" algorithm will now be explained in more detail.

As discussed earlier, the "strength" of a classifier is a utility measure of a classifier's success in generating useful messages over successive major cycles. It will be convenient to have a relational terminology in explaining the bucket brigade algorithm, so the terms "successor" and "grand-successor", and "predecessor" and "grand-predecessor" will be used. Suppose we have in two successive major cycles Classifier C and message M produce message M'
Classifier C' and message M' produce message M".

We will call M' the successor of C, and M" the grand-successor of C.

A major cycle begins with two "old" lists produced by the preceding major cycle, a classifier list and a message list, and produces "new" lists of both kinds for the next major cycle. This is accomplished in two steps (I) and (II).

(O) Initial Conditions

Assume that the old classifier list contains (among others) two classifiers C and C*, and assume that in the previous major cycle classifier C produced the message M' and by the bidding process (to be described) got it on the message list. In the bucket brigade algorithm, a stored strength parameter is associated with each classifier so we now have C, strength(C)

C*, strength(C*)

on the classifier list. Similarly, the message list entering this generational step includes an index connecting each message to its predecessor (i.e. the classifier which supplied it). An index to a classifier may take the form of a memory address, if the classifier is stored in a random access memory, or if parallel associative techniques are being employed, a tag field stored with the classifier and a like tag field stored with the generated message may be used to locate the predecessor which is to be rewarded. Thus, the message list includes M', index (C).

(I) Generation of Tentative New Message List

During this step each classifier is compared with all the messages on the old list. Suppost message M' satisfies a condition of classifier C*, and C* then produces a new message M" in the usual way. Note that M" is the successor of C* and hence the grand-successor of C. Classifier C* then makes a bid to get M" on the new list, its bid being of amount bid (M")=strength(C*) x specificity(C*) x constant.

Specificity equals the number of non-#(0 or 1) characters in the condition(s) of the related classifier. The role of the constant is merely to normalize all the bids. The following values are then available for creating the new message list:

M", bid(M"), index(C*), and index(C)

(II) Generation of (Final) New Message List and New Classifier List

The message list to be carried over to the next major cycle will (in general) be much shorter than the tentative new message list. The machine compares all the entries on the latter list and selects those with the highest bids, to within the capacity of the new message list. Let us suppose that bid(M") is sufficiently large for (M") to remain on the list after this elimination process.

The machine now carries out a reward process for successful classifiers on an exchange basis. Since the classifier C got its grand-successor M" on the new list this classifier is rewarded by having its strength increased by the amount bid by C* to get M" on the list, namely bid(M"). Classifiers having plural conditions are satisfied by plural messages, and those classifiers which supplied the messages then share the reward (bid(M")) by dividing it equally. This reward is charged to C* as the cost of getting its successor on the list, so that the strength of C* is decreased by bid(M"). Consequently, the entries for C and C* on the new classifier list will be C, strength(C)+bid(M")

C*, strength(C*)−bid(M").

After classifier C is rewarded by amount bid(M") and classifier C* is charged this amount, the information which needs to be retained relating to M" is simplified to M", index(C*), and the procedure continues as described for M', index(C).

The ultimate source of the strengths of successful classifiers derives from payoffs or rewards that the classifier system receives when its actions lead to specified goals in the environment. All classifiers active when a goal is reached have the payoff added to their strength. From major cycle to major cycle these payoffs are passed from classifier to classifier as in a bucket brigade, whence the name of the algorithm.

The combination of the basic classifier system and the bucket brigade algorithm provides a system capable of learning and adaptation in the sense that successful processes are allowed to achieve dominance in the procedural memory. However, the addition of the genetic algorithm is required to allow the system to discover new and promising processes.

A preferred form of genetic algorithm relies upon the strength value computed by the bucket brigade algorithm in order to select those classifiers which are to be models for reproduction (the strongest) and which are to be replaced (those having the smallest strength value) by the children of the strong. As an example, if there are 256 classifiers in the system, at the conclusion of each major cycle, the four classifiers having the greatest current strength might be used as models to form four non-identical copy classifiers which would replace the four weakest classifiers. Note that the four parent classifiers are not replaced or altered; they are merely used as a source of information about successful classifers.

The most useful form of genetic operator is the "crossover" operator which is implemented as follows. After a pair of classifiers each of length k are selected, a random number n between 1 and k is generated. Positions 1 to n of the first parent classifier are copied into positions 1 to n of the first child, the remainder of the first child being completed by copying from positions n+1 to k of the second parent classifier. The second child is copied from positions 1 to n of the second parent and positions n+1 to k of the first parent. These two newly created classifiers then replace two of the original classifiers having the lowest strength values.

On a less frequent basis (say one classifier per major cycle) a high strength classifier may also be copied, with a single character position modified at random, to form a mutation which replaces one of the weaker classifiers. In addition to this mutation operator, a relatively small number of classifiers may also form new classifiers by the application of an inversion operation in which one or more selected 1 or 0 characters in a superior classifier are inverted (i.e. a selected 1 is changed to a zero, and vice-versa).

The combination of the specific basic classifier system, the bucket brigade algorithm, and the genetic algorithm which have been described yield an adaptive computing system capable of skilled operation, learning and discovery. It is to be understood, however, that the specific arrangements and methods which have been described are merely illustrative of one application of the principles of the invention. Numerous modifications may be made by those skilled in the art without departing from the true spirit and scope of the invention.

What is claimed is:

1. A computing system comprising, in combination, a source of input data comprising k-bit binary message words, a message memory for storing said input data and additional k-bit binary message words, a classifier memory for storing a plurality of classifiers, each of said classifiers being composed of a condition part, an action part, and a strength value, said condition part comprising one or more k-position ternary words each of which specifies a subset of the possible k-bit binary message words, and said action part comprising at least one k-position ternary word which at least partially specifies the content of a new message word, matching means for comparing each message word in said message memory with the condition part of each classifier in said classifier memory, means responsive to said matching means for generating new message word whenever each of the ternary words in the condition part of a classifier is satisfied by at least one message in said message memory, and means for increasing the strength value associated with a particular classifier whenever said particular classifier generates a new message word to which a further classifier responds by generating a message word.

2. A computing system as set forth in claim 1 further comprising, in combination, means for decreasing the strength value associated with a given classifier whenever the given classifier responds to existing messages by generating a new message word.

3. A computing machine as set forth in claim 1 wherein the amount by which the strength value associated with said particular classifier is increased is directly related to the strength value associated with said further classifier.

4. A computing machine as set forth in claim 2 wherein the amount by which a strength value is decreased is directly related to the current magnitude of said strength value.

5. A computing machine as set forth in claim 1, 2, 3 or 4 comprising, in combination, means for selecting a pair of said classifiers in said classifier memory having high relative strength values, means for forming a new pair of classifiers, each of said new pair comprising portions copied from each of said selected pair, and means for replacing two classifiers in said classifier memory having low relative strength values with said new pair of classifiers.

6. A computing machine as set forth in claims 1, 2 or 3 wherein said matching means comprises an associative memory for at least partially comparing said messages and said classifiers simultaneously and in parallel.

7. A computing system comprising, in combination, a message store for storing a plurality of k-position binary message words, a classifier store for storing a plurality of classifiers, each of said classifiers comprising a condition part composed of at least one k-position ternary condition word which specifies a subset of possible message words and an action part which at least partially specifies the content of an output message, means for comparing said condition words with said message words, means for assigning an initial strength value to each of said classifiers, means responsive to said comparing means for forming a bid value whenever the specifications contained in the condition part of a given classifier is satisfied by one or more messages in said message store, said bid value being directly related to the current strength value of said given classifier and inversely related to the size of the subset of possible messages specified by the condition part of said classifier, means for producing new set of message words as specified by the action part of those particular classifiers which generated high relative bid values, means for reducing the current strength value assigned to each of said particular classifiers, and means for increasing the current strength value of those classifiers which produced a message word which satisfied the specifications of the condition part of one of said particular classifiers.

8. A computing system as set forth in claim 7 wherein the amount by which the current strength value of each of said particular classifiers is increased is directly related to the magnitude of the bid value formed by that classifier.

9. An adaptive method for processing input data from an external source into output data having desired characteristics comprising, in combination, the steps of (a) storing in a message memory of plurality of messages each comprising a sequence of binary digits, at least some of said messages containing information derived from said input data, (b) storing in a classifier memory a plurality of classifier each constituting an instruction governing the performance of a predetermined message translation step and each comprising, in combination, a condition part for identifying a class of said messages in said message memory which are to be translated by said translation step to form result messages, an action part specifying the functional relationship between messages in said class and said result messages, and a strength value;

(c) performing the message translation steps defined by said classifiers to produce a group of said result messages;

(d) replacing the messages stored in said message memory with messages from said group produced by classifiers having higher relative strength values; and (e) increasing the strength value of each classifier which produces a result message which is placed in said message memory and which in turn satisfies the condition part of a classifier to produce a further result message which is placed in said message memory.

10. An adaptive method as set forth in claim 9 wherein said step of replacing the messages stored in said message memory comprises the steps of forming a bid value associated with each of said result messages which is directly related to the magnitude of strength value and the specificity of the condition part of the classifier which produced said associated message, and replacing the messages stored in said message memory with those result messages having higher associated bid values.

11. An adaptive method as set forth in claims 9 or 10 further including means for periodically replacing classifiers in said classifier memory having relatively low strength values with modified versions of classifiers having relatively high strength values.

12. An adaptive method as set forth in claim 11 wherein each of said modified versions is formed by combining portions of two or more classifiers having relatively high strength values.

13. An adaptive computing method as set forth in claim 9 or 10, wherein said messages comprise a sequence of k-position binary words using the symbols "1" and "0" and said condition part of each of said classifiers comprises one or more k-position ternary words using the symbols "1", "0" and "#" and wherein said condition part specifies those messages having a "1" symbol at the digit positions where "1" symbols exist in said condition part, having "0" symbols at digit positions where "0" symbols exist in said condition part, and having either "1" or "0" symbols at digit positions where "#" symbols exist in said condition part.

14. An adaptive computing method as set forth in claim 13 wherein the number of "#" symbols in said condition part provides a specificity value for said condition part and wherein said step of replacing the messages includes means for replacing the messages stored in said message memory with messages from said group produced by classifiers having higher combined relative strength values and specificity values.

15. An adaptive computer system for processing input data from an external source to yield output data having predetermined characteristics, said system comprising, in combination:
- a message memory for storing messages, each of said messages comprising a unit of information represented as a sequence of binary digits;
- a classifier memory for storing a plurality of classifiers each consisting of
  - a condition part for specifying the attributes of one or more selected classes of messages stored in said message memory,
  - an action part for specifying the manner in which the messages in said selected classes are to be translated into output messages, and
  - a strength value indicative of the past utility of said classifier;
- input means for converting said input data from said external source into one or more messages and for storing said messages in said message memory;
- processing means for performing a plurality of independent procedures each in accordance with a respective one of said plurality of classifiers to generate a collection of result messages, and
- reward means responsive to selected result messages for increasing the strength value associated with those classifiers which produced said selected result messages.

16. An adaptive computer system as set forth in claim 15 wherein said selected result messages are messages which are specified by the condition parts of other classifiers.

17. An adaptive computer system as set forth in claim 15 or 16 further inluding means connected to said classifier memory for replacing classifiers having low strength values with modified versions of classifiers having high relative strength values.

18. An adaptive computer system as set forth in claim 17 wherein each of said modified versions contains information derived from one or more existing classifiers having high relative strength values.

19. An adaptive computing system comprising, in combination,
- a message memory for storing a plurality of messages, each message being represented by a sequence of binary digits;
- a classifier memory for storing a plurality of classifiers, each such classifier consisting of:
  - a condition part identifying selected messages which are to be read from the message memory and processed into result messages,
  - an action part which specifies the functional relationship between said selected messages and said result messages, and
  - a strength value; and
- processing means for translating messages in said message store in accordance with each of said classifiers, said processing means including means for increasing the strength value of any classifier which creates a result message which is itself specified by the condition part of a second classifier and translated into a further result message which is placed in said message store.

20. An adaptive computing system as set forth in claim 19 wherein said processing means further includes means for forming a bid value associated with every result message based at least in part on the strength value of the classifier which created said result message, and
- means included in said processing means for translating only those result messages having high associated bid values relative to the bid values of other result messages.

21. An adaptive computing system as set forth in claims 19 or 20 wherein said processing means further includes means for replacing classifiers having low strength values with modified versions of classifiers having higher strength values.

22. An adaptive computing system as set forth in claims 19 or 18 further including means for decreasing the strength value of each classifier which produces a result message which is made available for further processing by said processing means.

23. An adaptive computing system as set forth in claim 19 wherein said processing means further includes, in combination,
- means for forming a bid value associated with each message generated by a given classifier, said bid value being related to the strength of said given classifier, and
- means for translating only those messages which:
  - (a) are identified by the condition part of one or more classifiers, and
  - (b) having bid value greater than a threshold value.

24. An adaptive computing system as set forth in claim 23 wherein said means for increasing the strength value increases said strength value by an amount related to said bid value.

25. An adaptive computing system as set forth in claim 23 or 24 including means for decreasing the strength value of each of said given classifiers by the amount of said bid value whenever said given classifier generates an output message having an associated bid value greater than said threshold value.

26. An adaptive computing system for processing input information from an external source into output information delivered to external utilization means comprising, in combination,
- a message memory for storing a plurality of messages, each of said messages comprising a binary sequence of digits,
- a classifier memory for storing a plurality of classifiers each having a condition part, an action part and a strength value, said condition part specifying the attributes of a class of messages in said message memory which are to be translated into output messages in accordance with information contained in said action part, means establishing a sequence of major machine cycles, processing means operative during each of said major cycles for generating an output message whenever the condition part of any of said classifiers is satisfied by one or more messages in said message memory, means for replacing the messages present in said message memory at the start of a given major cycle with the output messages generated during said given major cycle, input message handling means connected to said external source for placing input messages into said message memory prior to at least one of said major cycles, output message handling means for selecting output messages having predetermined desired characteristics from said message memory and delivering said output messages to said external utilization means, and means for increasing the strength value of each classifier which generates a message which, during the next major cycle, is delivered to said external utilization means or causes the generation of a further output message by satisfying the condition part of a classifier.

27. An adaptive computing system as set forth in claim 26 wherein said processing means comprises a plurality of concurrently operating parallel processors.

28. An adaptive computing system as set forth in claim 26 wherein said processing means includes means for generating output messages only in response to those messages which were generated by classifiers having higher relative strength values.

29. An adaptive computing system as set forth in claim 26 or 28 wherein said means for replacing the messages present in said message memory further includes means for decreasing the strength value of each classifier which supplied a replacement message to said message memory.

30. An adaptive computing system as set forth in claims 26 or 28, wherein said means for replacing messages in said message memory further includes means for forming a bid value associated with each given one of said output messages having a magnitude related to the strength of the classifier which produced said given message, and means for replacing messages in said message memory with those messages having higher associated bid values.

31. An adaptive computing system as set forth in claim 30 wherein said means for forming said bid value includes means for forming a bid value having a magnitude directly related to both the strength value of the classifier which produced said given message and inversely related to the size of the class of messages to be translated as specified by the action part of the classifier which produced said given message.

32. An adaptive computing system as set forth in claim 26 wherein said processing means further includes means for generating output messages only in response to those messages which were generated by classifiers having higher relative strength values and having condition parts satisfied by a relatively restricted class of messages.

33. An adaptive computing system as set forth in claim 26 including means for replacing classifiers having lower relative strength values with substitute classifiers.

34. An adaptive computing system as set forth in claim 33 wherein said substitute classifiers are formed by combinations of portions of classifiers having high relative strength values.

35. An adaptive computing system as set forth in claim 33 wherein said substitute classifiers are formed by modifying existing classifiers having high relative strength values.

36. An adaptive computing system as set forth in claim 26 wherein said message memory takes the form of an associative memory and wherein said processing means during each of said major cycles presents the condition part of each of said classifiers in succession for comparison against the messages stored in said associative memory.

37. An adaptive computing system as set forth in claims 9, 15, 19 or 26 wherein said condition part defines at least first and second classes of messages and wherein said classifier translates each message in said first class into an output message provided at least one message exists in said second class.

38. An adaptive computing system as set forth in claims 9, 15, 19 or 26 wherein said condition part of at least some of said classifiers defines at least first and second classes of messages and further including a negation indicia associated with said second class and wherein said classifier translates each message in said first class into an output message provided no messages exist in said second class.

39. An adaptive computing system as set forth in claims 9, 15, 19 or 26 wherein said action part of at least some of said classifiers includes an operation identifier for specifying a functional relationship between information contained in one or more messages satisfying the condition part of said classifier and information contained in the output message generated by said classifier.

40. An adaptive computing system as set forth in claims 9, 15, 19 or 26 wherein each given one of said messages has associated therewith an index value which identifies the classifer which produced said given message.

* * * * *